(12) United States Patent
Kim et al.

(10) Patent No.: US 7,023,156 B2
(45) Date of Patent: Apr. 4, 2006

(54) REVERSIBLE MOTOR

(75) Inventors: Hyeon Kim, Changwon-shi (KR); Cheol Ki No, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/488,510

(22) PCT Filed: May 31, 2002

(86) PCT No.: PCT/KR02/01040

§ 371 (c)(1),
(2), (4) Date: Aug. 18, 2004

(87) PCT Pub. No.: WO03/021751

PCT Pub. Date: Mar. 13, 2003

(65) Prior Publication Data

US 2004/0257015 A1    Dec. 23, 2004

(30) Foreign Application Priority Data

Sep. 4, 2001  (KR) ............................... 2001-54164
Sep. 12, 2001 (KR) ............................... 2001-56244

(51) Int. Cl.
*H02P 1/00* (2006.01)
(52) U.S. Cl. ...................... 318/280; 318/287; 318/130; 318/256

(58) Field of Classification Search ................ 318/280, 318/287, 290, 130, 256; 320/167; 477/36; 417/18
See application file for complete search history.

(56) References Cited

U.S. PATENT DOCUMENTS 5,340,282 A * 8/1994 Milocco ...................... 417/18
6,016,049 A * 1/2000 Baughman et al. ......... 320/167

FOREIGN PATENT DOCUMENTS

| EP | 0597370 A1 | 5/1994 |
| JP | 60241782 A | 11/1985 |
| JP | 7023551 A | 1/1995 |

\* cited by examiner

*Primary Examiner*—Karen Masih
(74) *Attorney, Agent, or Firm*—Birch, Stewart, Kolasch & Birch, LLP

(57) ABSTRACT

Reversible motor including a stator having two windings (a–a', b–b'), a start apparatus (c–c') connected to one of the two windings (a–a', b–b') in series, switches (310,330,350) for providing power to the two windings selectively, wherein the switches, for reversing the motor, are connected selectively such that the direction of the current in the one of the two windings is reversed and the start apparatus is connected to the other one of the two windings in series, and a turns ratio and a cross section area ratio of the two windings being adjusted for a sufficient start torque and an optimal efficiency of the reversible motor.

19 Claims, 5 Drawing Sheets

REVERSIBLE MOTOR

TECHNICAL FIELD

The present invention relates to a motor, and more particularly, to a reversible motor applicable to a compressor.

BACKGROUND ART

In general, a single phase unidirectional induction motor frequently used for a compressor is provided with a stator, a rotor, and a running capacitor.

Referring to FIG. 1 illustrating a quarter of a motor stator section, the stator has slots 100 at fixed intervals. The stator has two windings each turned around the slots a few tens of times. The running capacitor is connected to one of the two windings in series. The rotor is rotated under the influence of a magnetic field formed by the stator.

A system and operation of the unidirectional motor will be explained, with reference to FIG. 2.

Referring to FIG. 2, the unidirectional motor is provided with two windings a–a', and b–b' and a running capacitor.

One end 'a' of the a–a' winding and one end 'c' of the running capacitor are connected to a power source. The other end 'c'' of the running capacitor is connected to one end 'b' of the b–b' winding. The other end 'a'' of the a–a' winding, and the other end 'b'' of the b–b' winding, are grounded.

Currents are provided to the two windings, with directions of the currents fixed beforehand, such that the rotor is rotated in a required direction according to Flemming's left-hand rule. In this instance, the current to the winding b–b' having the running capacitor connected in series has a phase 90° earlier than the winding a–a' having no running capacitor connected thereto. Then, a magnetic field formed by the current to the winding b–b' having the running capacitor connected in series produces a starting torque, and a magnetic field formed by the current to the winding a–a' having no running capacitor connected thereto sustains the rotation of the initially started rotor. Eventually, the rotor of the unidirectional motor is rotated in a required one direction under the influence of the magnetic fields formed by the currents to the two windings.

The running capacitor, a kind of starting means for starting the rotor, can be replaced with a switch, or a combination of the running capacitor and the switch, though a principle for starting the rotor is a little different from the running capacitor.

In the meantime, a winding ratio ('a number of wires passed through a section of the slot having no running capacitor connected thereto in series'/'a number of wires passed through a section of the slot having the running capacitor connected thereto in series'), and a sectional area ratio ('a sectional area of a winding having no running capacitor connected thereto in series'/'a sectional area of a winding having the running capacitor connected thereto in series') influence the starting torque of the motor and a motor efficiency ('work done by the motor'/'power supplied to the motor'). The winding ratio and the sectional area ratio of the unidirectional motor are designed so that the unidirectional rotation of the motor is appropriate, in other words, the starting torque is adequate for the unidirectional rotation, and an efficiency of the motor is maximized. In general, the winding ratio of the unidirectional motor is set to be within a range of 1.1–1.6, and the sectional area ratio is set to be within a range of 1.44–2.56.

Thus, because the related art unidirectional motor requires a separate mechanical device, such as a clutch, for reverse direction rotation, the related art motor has a high production cost, a greater volume as much, and noise from the mechanical device.

DISCLOSURE OF INVENTION

An object of the present invention, devised for solving the problems, lies on providing a reversible motor which can reverse without a separate mechanical device, such as a clutch.

Another object of the present invention is to provide a reversible motor which can provide an optimum efficiency, and an adequate starting torque even for a reverse rotation.

In one aspect of the present invention, the objects of the present invention can be achieved by providing a reversible motor including a stator having two windings, starting means connected to one of the two windings in series, and switches for selective supply of power to the two windings, wherein the switches are selectively connected, such that a current direction in one of the two windings is reversed, and the starting means is connected to the other one of the two windings for reversing the motor.

In another aspect of the present invention, there is provided a reversible motor including a stator having two windings each with an electrode branched therefrom, starting means connected to one of the electrodes on one of the two windings in series, and switches for selective supply of power to the two windings and the two electrodes, wherein the switches are selectively connected, such that a current direction in one of the two windings is reversed, and the starting means is connected to the other one of the two electrodes on one of the two windings for reversing the motor.

Thus, the reversible motor of the present invention can be rotated, not only in a regular direction, but also in a reverse direction.

BEST MODE FOR CARRYING OUT THE INVENTION

One embodiment of a reversible motor of the present invention will be explained in detail, with reference to the attached drawings.

Figure 3:
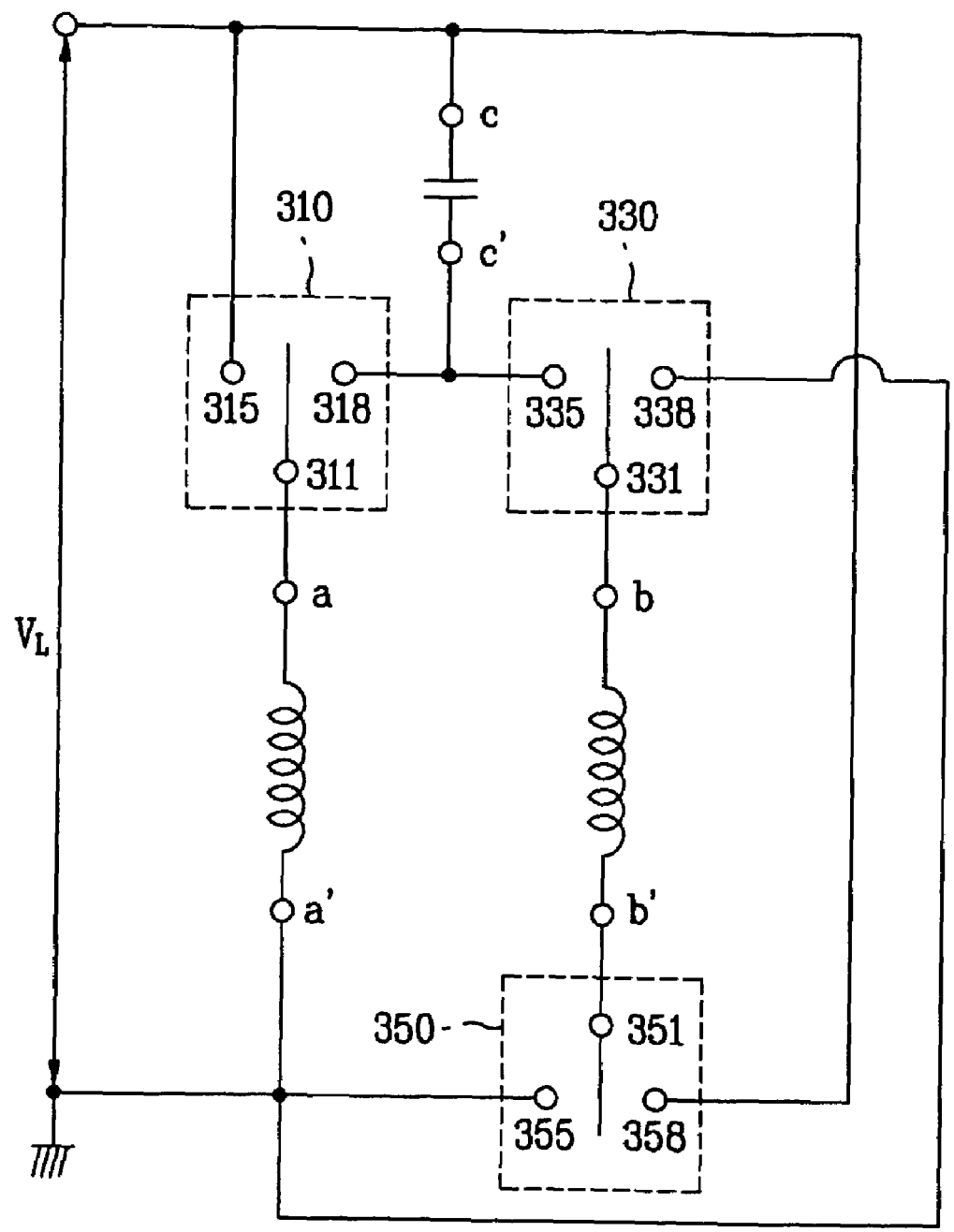
FIG. 3 illustrates a circuit of a reversible motor showing windings and a running capacitor connected to a power source in accordance with one embodiment of the present invention.

FIG. 3 illustrates a circuit of a reversible motor showing windings and a running capacitor connected to a power source in accordance with one embodiment of the present invention.

Referring to FIG. 3, the reversible motor includes two windings a–a', and b–b', starting means, three three point type switches 310, 330, and 350 for selective connection of the two windings and the starting means, and control means (not shown) for controlling the three switches 310, 330, and 350. Though the starting means may be the capacitor, the switches, or a combination of them, the description hereafter is given on the assumption that the starting means is the capacitor. Though the control means may be a control circuit or a microcomputer, the description hereafter is given on the assumption that the control means is the microcomputer.

A terminal 315 of the switch 310, one end 'c' of the running capacitor, and a terminal 358 of the switch 350 are connected to a power source. The other end 'c'' of the running capacitor is connected to a terminal 318 of the switch 310 and a terminal 335 of the switch 330. One end 'a'' of the winding a–a' is connected to a terminal 311 of the switch 310, and one end 'b'' of the winding b–b' is connected to a terminal 331 of the switch 330. The other end 'a'' of the winding a–a', a terminal 338 of the switch 330, and a terminal 355 of the switch 350 are grounded. The other end 'b'' of the winding b–b' is connected to a terminal 351 of the switch 350.

A case when the reversible motor rotates in one direction (hereafter taken as 'a regular direction') will be explained.

For rotating the reversible motor in a regular direction, the microcomputer connects the terminal 311 to the terminal 315 of the switch 310, the terminal 331 to the terminal 335 of the switch 330, and the terminal 351 to the terminal 355 of the switch 350.

Figure 1:
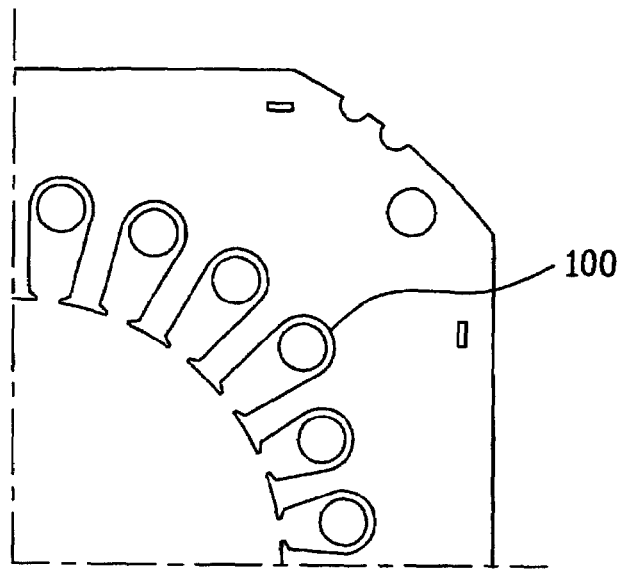
FIG. 1 illustrates a quarter section of a motor stator.
Figure 2:
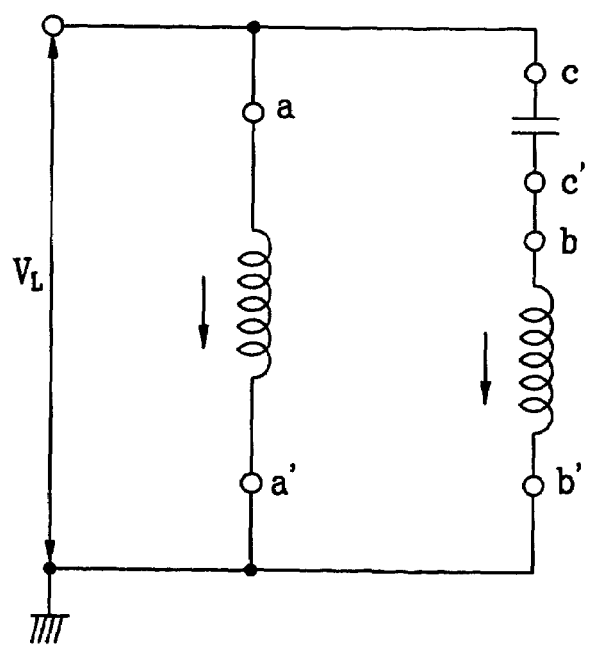
FIG. 2 illustrates a related art circuit of the stator in FIG. 1 showing windings and a running capacitor connected to a power source.
Figure 4A:
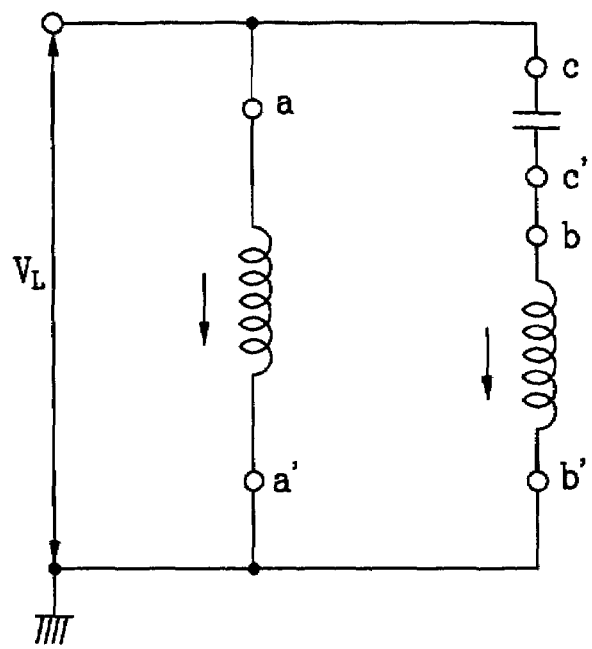
FIG. 4A illustrates a circuit of the reversible motor in FIG. 3 switched for regular direction rotation.

Then, the windings and the running capacitor of the reversible motor are connected to the power source as shown in FIG. 4A, such that currents flow to the two winding in directions as shown in FIG. 4A. Flow of the currents to the two windings and a position of the running capacitor of the stator of the reversible motor shown in FIG. 4A are identical to the flow of the currents to the two windings and a position of the running capacitor of the stator of the unidirectional motor shown in FIG. 2. Therefore, the reversible motor rotates in a regular direction.

A case when the reversible motor rotates in a direction (hereafter taken as 'a reverse direction') opposite to the one direction will be explained.

For rotating the reversible motor in the reverse direction, the microcomputer connects the terminal 311 to the terminal 318 of the switch 310, the terminal 331 to the terminal 338 of the switch 330, and the terminal 351 to the terminal 358 of the switch 350.

Figure 4B:
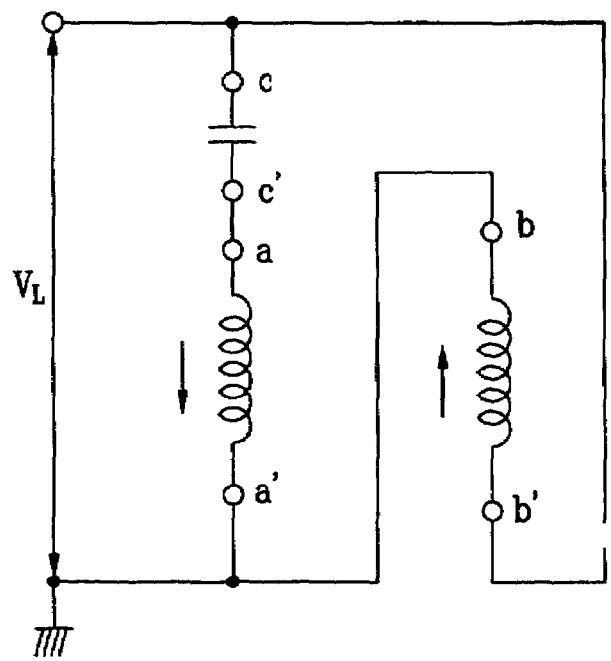
FIG. 4B illustrates a circuit of the reversible motor in FIG. 3 switched for reverse direction rotation.

Then, the windings and the running capacitor of the reversible motor are connected to the power source as shown in FIG. 4B. Accordingly, as shown in FIG. 4B, a current in a direction from 'a' to 'a'' flows in the winding a–a' of the stator of the reversible motor, and the running capacitor is connected to the winding a–a' in series. And, a current in a direction from 'b'' to 'b' flows in the winding b–b' of the stator of the reversible motor. FIG. 4B may be compared to FIG. 4A illustrating the current flow to the two windings and a position of the running capacitor when the reversible motor rotates in the regular direction, to find that the direction of the current in the b–b' winding is reversed, and the running capacitor is connected, not to the b–b' winding, but to a–a' winding. A magnetic field formed by the current in the a–a' winding produces a starting torque for the rotor, and a magnetic field formed by the current in the b–b' winding flowing in a direction from 'b'' to 'b' sustains reverse rotation of the rotor after an initial starting of the rotor. Accordingly, the reversible motor rotates in the reverse direction.

In the meantime, it is preferable that the winding ratio and the sectional area ratio (or a wire diameter ratio) are adjusted for optimizing the efficiency and the starting torque of the reversible motor both for regular and reverse direction rotations, which will be discussed.

It is preferable that a regular direction rotation winding ratio of the two windings ('a number of wires passed through a section of the slot having no running capacitor connected thereto in series'/'a number of wires passed through a section of the slot having the running capacitor connected thereto in series' in the regular direction rotation), is set to be in a range of 0.71 to 0.98, and a reverse direction rotation winding ratio of the two windings ('a number of wires passed through a section of the slot having no running capacitor connected thereto in series'/'a number of wires passed through a section of the slot having the running capacitor connected thereto in series' in the reverse direction rotation), is set to be an inverse of the regular direction rotation winding ratio.

It is preferable that a regular direction rotation sectional area ratio of the two windings ('a sectional area of a winding having no running capacitor connected thereto in series'/'a sectional area of a winding having the running capacitor connected thereto in series' in the regular direction rotation) is within a range of 1.04–2.75, and a reverse direction rotation sectional area ratio of the two windings ('a sectional area of a winding having no running capacitor connected thereto in series'/'a sectional area of a winding having the running capacitor connected thereto in series' in the reverse direction rotation) is an inverse of the regular direction rotation sectional area ratio.

When sections of wires of the two windings are circular, the sectional area ratio may be expressed as a wire diameter ratio. In other words, when the sections of wires of the two windings are circular, it is preferable that a regular direction rotation wire diameter ratio of the two windings ('a wire diameter of a winding having no running capacitor connected thereto in series'/'a wire diameter of a winding having the running capacitor connected thereto in series' in the regular direction rotation) is within a range of 1.02–1.66, and a reverse direction rotation wire diameter ratio of the two windings ('a wire diameter of a winding having no running capacitor connected thereto in series'/'a wire diameter of a winding having the running capacitor connected thereto in series' in the reverse direction rotation) is an inverse of the regular direction rotation wire diameter ratio.

When the winding ratios and the sectional area ratios (or wire diameter ratios) respectively fall on above ranges, the reversible motor exhibits adequate starting torques and an appropriate efficiencies both in the regular direction rotation and the reverse direction rotation. Since an efficiency of the reversible motor having above winding ratios and sectional area ratios is approx. 83% in the regular direction, and approx. 80% in the reverse direction rotation, the efficiencies are acceptable for industrial use.

In the reversible motor of this embodiment, the regular direction rotation winding ratio and the reverse direction rotation winding ratio can not, but be in a relation of an inverse in view of a structure of the stator.

Contrary to this, a reversible motor in accordance with another embodiment of the present invention, in which the regular direction rotation winding ratio and the reverse direction rotation winding ratio can be adjusted independent from each other, will be explained, with reference to the attached drawings.

Figure 5:
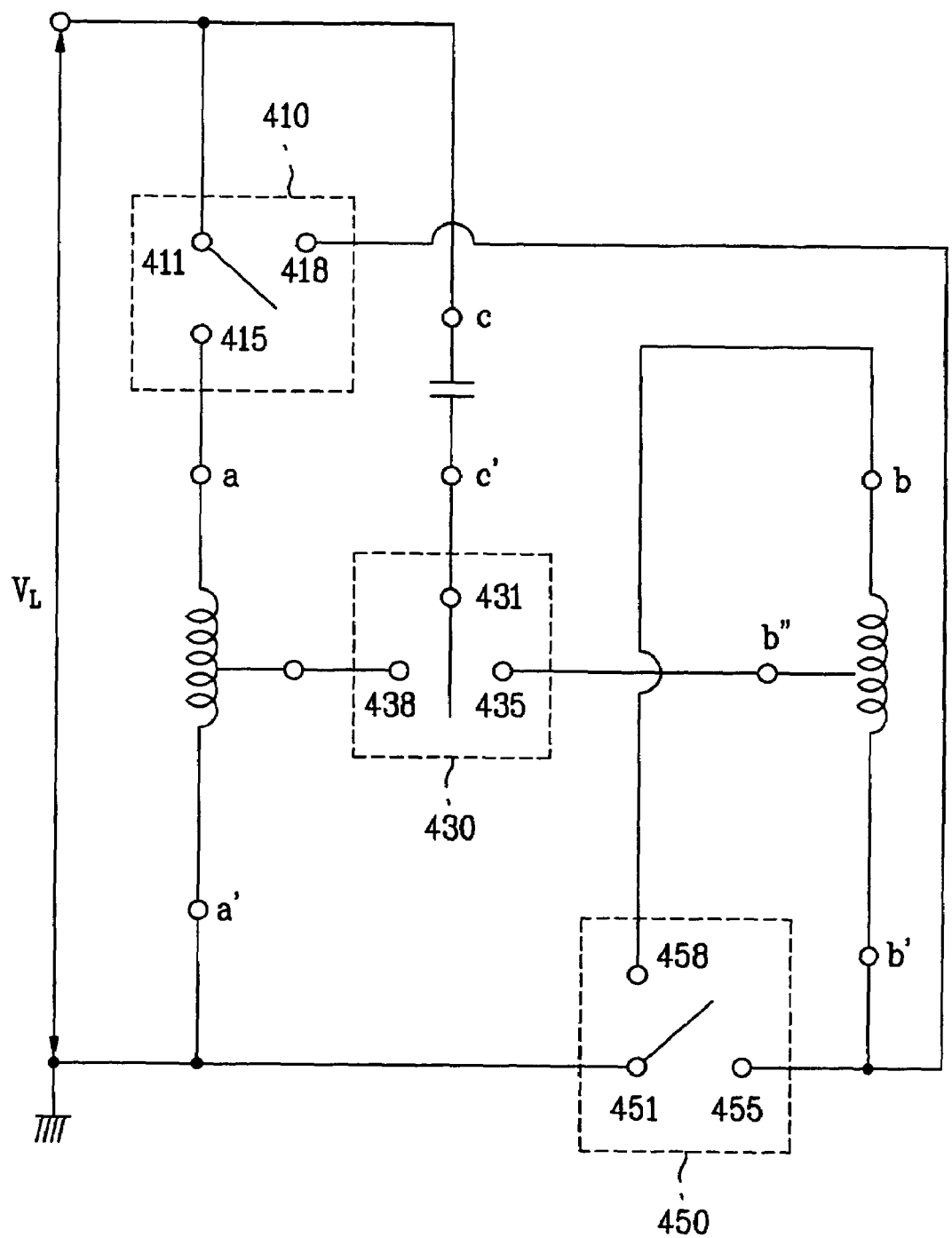
FIG. 5 illustrates a circuit of a reversible motor showing windings and a running capacitor connected to a power source in accordance with another preferred embodiment of the present invention.

FIG. 5 illustrates a circuit of a reversible motor showing windings and a running capacitor connected to a power source in accordance with another preferred embodiment of the present invention.

Referring to FIG. 5, the reversible motor includes two windings a–a', and b–b' each having a branch electrode (a" or b") on each of the windings, starting means, three three point type switches 410, 430, and 450 for selective connection of the two windings, the branch electrodes, and the starting means, and control means (not shown) for controlling the three switches 410, 430, and 450. Though the starting means may be the capacitor, the switches, or a combination of them, the description hereafter is given on the assumption that the starting means is the capacitor. Though the control means may be a control circuit or a microcomputer, the description hereafter is given on the assumption that the control means is the microcomputer.

A terminal 411 of the switch 410, and one end 'c' of the running capacitor are connected to a power source. The other end 'c'' of the running capacitor is connected to a terminal 431 of the switch 430. A terminal 415 of the switch 410 is connected to one end 'a'' of the winding a–a'. A terminal 438 of the switch 430 is connected to the branch electrode 'a''' of the a–a' winding, and a terminal 435 of the switch 430 is connected to a branch electrode 'b''' of the b–b' winding. A terminal 458 of the switch 450 is connected to one end 'b' of the b–b' winding. A terminal 418 of the switch 410 and a terminal 455 of the switch 450 are connected to the other end 'b'' of the b–b' winding. The other end 'a' of the winding a–a', and a terminal 451 of the switch 450 are grounded.

A case when the reversible motor rotates in one direction (hereafter taken as 'a regular direction') will be explained.

For rotating the reversible motor in a regular direction, the microcomputer connects the terminal 411 to the terminal 415 of the switch 410, the terminal 431 to the terminal 435 of the switch 430, and the terminal 451 to the terminal 455 of the switch 450.

Figure 6A:
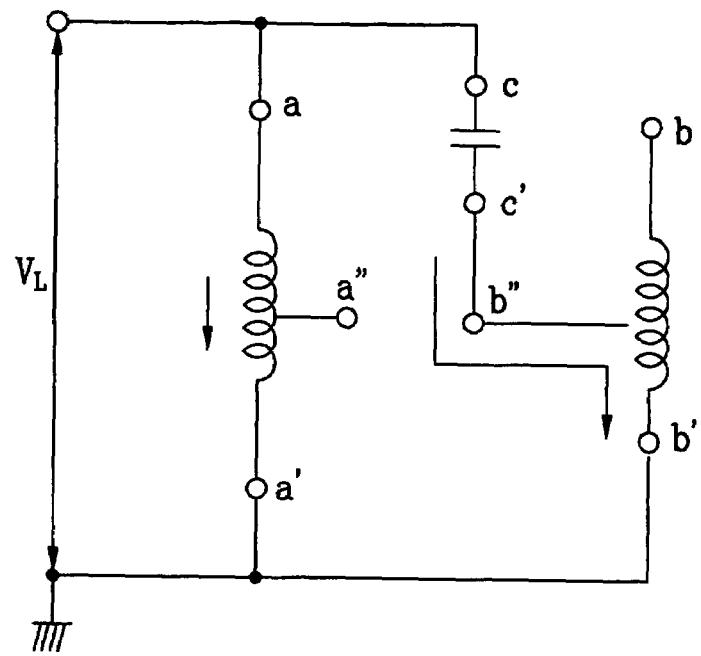
FIG. 6A illustrates a circuit of the reversible motor in FIG. 5 switched for regular direction rotation.

Then, the windings and the running capacitor of the reversible motor are connected to the power source as shown in FIG. 6A, such that currents flow to the two winding in directions as shown in FIG. 6A. Flow of the currents to the two windings and a position of the running capacitor of the stator of the reversible motor shown in FIG. 6A are identical to the flow of the currents to the two windings and a position of the running capacitor of the stator of the unidirectional motor shown in FIG. 2, except that no current flows in a part (b–b") of the b–b' winding. Therefore, the reversible motor rotates in the regular direction.

A case when the reversible motor rotates in a direction (hereafter taken as 'a reverse direction') opposite to the one direction will be explained.

For rotating the reversible motor in the reverse direction, the microcomputer connects the terminal 411 to the terminal 418 of the switch 410, the terminal 431 to the terminal 438 of the switch 430, and the terminal 451 to the terminal 458 of the switch 450.

Figure 6B:
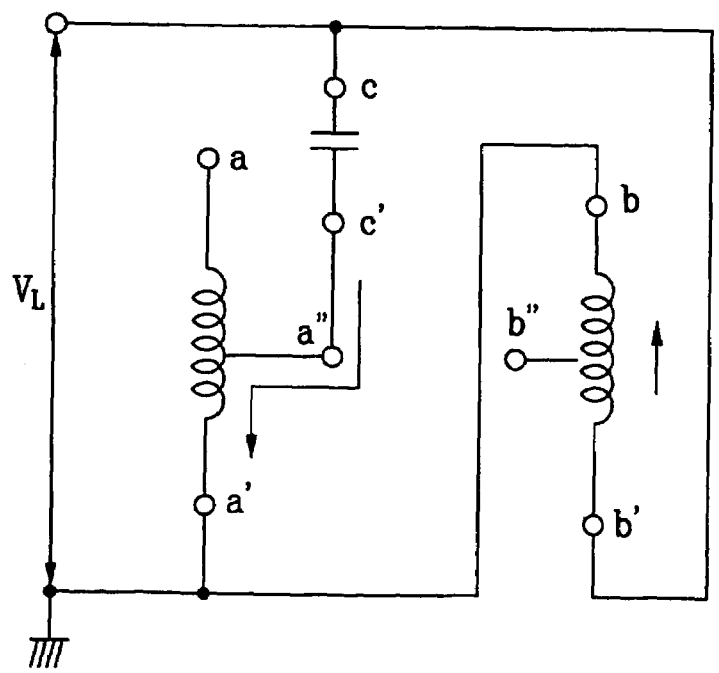
FIG. 6B illustrates a circuit of the reversible motor in FIG. 5 switched for reverse direction rotation.

Then, the windings and the running capacitor of the reversible motor are connected to the power source as shown in FIG. 6B. Accordingly, as shown in FIG. 6B, a current in a direction from 'a''' to 'a'' flows in the winding a"–a' of the stator of the reversible motor (no current flows in the a–a" winding), and the running capacitor is connected to the winding a'''–a' in series. And, a current in a direction from 'b''' to 'b' flows in the winding b–b' of the stator of the reversible motor. Current flow in the two windings, and a position of the running capacitor in the stator of the reversible motor shown in FIG. 6B are identical to the current flow in the two windings, and the position of the running capacitor in the stator of the reversible motor of the present invention shown in FIG. 4B in the case of reverse direction rotation, except that no current flows in a part of winding (a–a" winding) of the a–a' winding. Therefore, the reversible motor rotates in the reverse direction.

In this embodiment reversible motor of the present invention, since an electrode is branched from a point of each of the two windings of the stator, and power is supplied to the two windings and the branch electrodes selectively, a part of the winding is not used depending on a direction of rotation. Therefore, it is required to pay attention to that the winding ratio described hereafter is not a number of wires of each of the two windings wound on the slots of the stator, but a ratio of number of wires of two windings influencing to rotation of the motor actually, i.e., a ratio of a number of wires of the two windings currents flow therein actually.

In this point of view, the winding ratio of this embodiment of reversible motor of the present invention will be discussed.

By branching the two electrodes from desired points of the two windings, the regular direction rotation winding ratio of the two windings ('a number of wires passed through a section of the slot having no running capacitor connected thereto in series'/'a number of wires passed through a section of the slot having the running capacitor connected thereto in series' in the regular direction rotation), and the reverse direction rotation winding ratio of the two windings ('a number of wires passed through a section of the slot having no running capacitor connected thereto in series'/'a number of wires passed through a section of the slot having the running capacitor connected thereto in series' in the reverse direction rotation) can be adjusted independent from each other.

In the meantime, for optimum efficiencies and starting torques of this embodiment reversible motor, it is preferable that the regular direction rotation winding ratio and the reverse direction rotation winding ratio are the same, and the electrodes are branched from points on the two windings such that the regular direction rotation winding ratio and the reverse direction winding ratio fall on a range (1.1–1.6) of the winding ratio of the related art unidirectional motor.

Moreover, it is preferable that the regular direction rotation sectional area ratio of the two windings ('a sectional area of a winding having no running capacitor connected thereto in series'/'a sectional area of a winding having the running capacitor connected thereto in series' in regular direction rotation) falls on a range of 1.04–2.75, and the reverse direction rotation sectional area ratio of the two windings ('a sectional area of a winding having no running capacitor connected thereto in series'/'a sectional area of a winding having the running capacitor connected thereto in series' in reverse direction rotation) is an inverse of the regular direction rotation sectional area ratio.

As explained before, when the sections of wires of the two windings are circular, the sectional area ratio may be expressed in the wire diameter ratio. It is preferable that a regular direction rotation wire diameter ratio of the two windings ('a wire diameter of a winding having no running capacitor connected thereto in series'/'a wire diameter of a winding having the running capacitor connected thereto in series' in the regular direction rotation) is within a range of 1.02–1.66, and a reverse direction rotation wire diameter ratio of the two windings ('a wire diameter of a winding having no running capacitor connected thereto in series'/'a wire diameter of a winding having the running capacitor connected thereto in series' in the reverse direction rotation) is an inverse of the regular direction rotation wire diameter ratio.

INDUSTRIAL APPLICABILITY

Industrial applicability of the reversible motor of the present invention will be explained.

First, since the reversible motor of the present invention can dispense with the mechanical device, such as a clutch, an apparatus the motor is applied thereto, such as a compressor, can have a volume reduced as much, and eliminate noise from the clutch itself.

Second, by appropriate adjustment of the winding ratios and the sectional area ratio (or wire diameter ratio) of the reversible motor, the reversible motor of the present invention can provide efficiencies appropriate for industrial use both for regular/reverse direction rotations.

Third, the reversible motor of the present invention is preferably applicable to a variable compressor.

What is claimed is:

1. A reversible motor comprising:
   a stator having two windings;
   starting means connected to one of the two windings in series, the other of the two windings being connected in parallel with a series connection of the staring means and the one of the two windings; and
   switches for selective supply of power to the two windings,
   wherein the switches are selectively connected, such that a current direction in the one of the two windings is reversed, and the starting means is connected to the other one of the two windings in series for reversing the motor, the one of the two windings being connected in parallel with a series connection of the staring means and the other of the two windings.

2. A reversible motor as claimed in claim 1, wherein the starting means is at least one capacitor.

3. A reversible motor as claimed in claim 1, wherein the starting means is at least one switch.

4. A reversible motor as claimed in claim 1, wherein the starting means is a combination of at least one capacitor and at least one switch.

5. A reversible motor as claimed in claim 1, wherein the two windings have a regular direction rotation winding ratio falling on a range of 0.71–0.98, and a reverse direction rotation winding ratio being an inverse of the regular direction rotation winding ratio.

6. A reversible motor as claimed in claim 1, wherein the two windings have a regular direction rotation wire sectional area ratio falling on a range of 1.04–2.75, and a reverse direction rotation wire sectional area ratio being an inverse of the regular direction rotation wire sectional area ratio.

7. A reversible motor as claimed in claim 1, wherein the two windings have a regular direction rotation wire diameter ratio falling on a range of 1.02–1.66, and a reverse direction rotation wire diameter ratio being an inverse of the regular direction rotation wire diameter ratio.

8. A reversible motor as claimed in claim 5, wherein the two windings have a regular direction rotation wire sectional area ratio falling on a range of 1.04–2.75, and a reverse direction rotation wire sectional area ratio being an inverse of the regular direction rotation wire sectional area ratio.

9. A reversible motor as claimed in claim 5, wherein the two windings have a regular direction rotation wire diameter ratio falling on a range of 1.02–1.66, and a reverse direction rotation wire diameter ratio being an inverse of the regular direction rotation wire diameter ratio.

10. A reversible motor comprising:
    a stator having two windings, each of the two windings having a tap branched therefrom;
    starting means connected to the tap of one of the two windings; and
    switches for selective supply of power to the two windings and the two taps,
    wherein the switches are selectively connected, such that a current direction in one of the two windings is reversed, and the starting means is disconnected from the tap of the one of the two windings and is connected to the tap of the other of the two windings for reversing the motor.

11. A reversible motor as claimed in claim 10, wherein the starting means is at least one capacitor.

12. A reversible motor as claimed in claim 10, wherein the starting means is at least a switch.

13. A reversible motor as claimed in claim 10, wherein the starting means is a combination of at least one capacitor and at least one switch.

14. A reversible motor comprising:
    a stator having two windings each with an electrode branched therefrom;
    starting means connected to one of the electrodes on one of the two windings in series; and
    switches for selective supply of power to the two windings and the two electrodes,
    wherein the switches are selectively connected, such that a current direction in one of the two windings is reversed, and the starting means is connected to the other one of the two electrodes on one of the two windings for reversing the motor, and a regular direction rotation winding ratio and a reverse direction rotation winding ratio being adjustable independently from each other by adjusting branching positions of the two electrodes from the two windings.

15. A reversible motor as claimed in claim 14, wherein the two windings have the same regular direction rotation winding ratio and reverse direction rotation winding ratio falling on a range of 1.1–1.6.

16. A reversible motor as claimed in claim 14, wherein the two windings have a regular direction rotation wire sectional area ratio falling on a range of 1.04–2.75, and a reverse direction rotation wire sectional area ratio being an inverse of the regular direction rotation wire sectional area ratio.

17. A reversible motor as claimed in claim 14, wherein the two windings have a regular direction rotation wire diameter ratio falling on a range of 1.02–1.66, and a reverse direction rotation wire diameter ratio being an inverse of the regular direction rotation wire diameter ratio.

18. A reversible motor as claimed in claim 15, wherein the two windings have a regular direction rotation wire sectional area ratio falling on a range of 1.04–2.75, and a reverse direction rotation wire sectional area ratio being an inverse of the regular direction rotation wire sectional area ratio.

19. A reversible motor as claimed in claim 15, wherein the two windings have a regular direction rotation wire diameter ratio falling on a range of 1.02–1.66, and a reverse direction rotation wire diameter ratio being an inverse of the regular direction rotation wire diameter ratio.

* * * * *